(12) United States Patent
Noldus et al.

(10) Patent No.: US 9,026,599 B2
(45) Date of Patent: May 5, 2015

(54) METHOD AND SYSTEM FOR TRANSFERRING A MESSAGE

(75) Inventors: Rogier August Caspar Joseph Noldus, Goirle (NL); Jos Den Hartog, Capelle a/d Ijssel (NL)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 116 days.

(21) Appl. No.: 13/500,290

(22) PCT Filed: Oct. 8, 2009

(86) PCT No.: PCT/NL2009/050608
§ 371 (c)(1),
(2), (4) Date: Jun. 5, 2012

(87) PCT Pub. No.: WO2011/043646
PCT Pub. Date: Apr. 14, 2011

(65) Prior Publication Data
US 2012/0239770 A1    Sep. 20, 2012

(51) Int. Cl.
*H04L 29/06*   (2006.01)
*H04L 29/08*   (2006.01)

(52) U.S. Cl.
CPC ............ *H04L 65/1006* (2013.01); *H04L 67/14* (2013.01); *H04L 67/2842* (2013.01); *H04L 67/147* (2013.01)

(58) Field of Classification Search
None
See application file for complete search history.

(56) References Cited

U.S. PATENT DOCUMENTS

| 6,807,173 B1 | 10/2004 | Lee et al. |
| 8,010,611 B2 * | 8/2011 | Wang et al. ................ 709/206 |

(Continued)

FOREIGN PATENT DOCUMENTS

| CN | 1859321 A | 11/2006 |
| CN | 101304549 A | 11/2008 |
| EP | 1931102 A1 | 6/2008 |

OTHER PUBLICATIONS

Burger, E., "A Mechanism for Content Indirection in Session Initiation Protocol (SIP) Messages", RFC 4483, May 2006.*

(Continued)

*Primary Examiner* — Scott B Christensen
*Assistant Examiner* — Sean Concannon
(74) *Attorney, Agent, or Firm* — Coats and Bennett, PLLC

(57) ABSTRACT

Method and system for transferring a message, comprising routing information relating to the intended recipient of the message and content information, from a first node via a second node to a third node in a communications network. According to the invention, a repository is associated with the second node. The method comprises the steps of: transmitting the message from the first node to the second node; storing data representative of the content information in the repository of the second node; replacing, by the second node, in the message, the content information by a token; transmitting the message, comprising the routing information and the token, from the second node to the third node; retrieving, by the third node, the content information from the second node; and replacing by the third node, in the message, the token by the content information.

14 Claims, 4 Drawing Sheets

(56) References Cited

U.S. PATENT DOCUMENTS

| | | | |
|---|---|---|---|
| 8,418,231 B2* | 4/2013 | Denny et al. | 726/4 |
| 2004/0083291 A1 | 4/2004 | Pessi et al. | |
| 2004/0107143 A1* | 6/2004 | Niemi | 705/26 |
| 2005/0226174 A1 | 10/2005 | Kiss | |
| 2007/0061373 A1* | 3/2007 | Kilday | 707/200 |
| 2007/0165865 A1* | 7/2007 | Talvitie | 380/286 |
| 2008/0170563 A1* | 7/2008 | Zhu et al. | 370/352 |
| 2008/0307062 A1* | 12/2008 | Wang | 709/206 |
| 2010/0172241 A1* | 7/2010 | Patel | 370/235 |
| 2012/0173736 A1* | 7/2012 | Klein | 709/227 |

OTHER PUBLICATIONS

Rosenberg, J., et al. "RFC 3261: SIP: Session initiation protocol." (2003).*

Vargic, R., et al. "IMS interworking using IBCF." Convergence and Hybrid Information Technology, 2008. ICCIT'08. Third International Conference on. vol. 2. IEEE, 2008.*

Burger, E., et al., "A Mechanism for Content Indirection in Session Initiation Protocol (SIP) Messages." Internet Engineering Task Force (IETF) Standard-Working-Draft. Oct. 25, 2004.

* cited by examiner

```
MESSAGE sip:john.smith@receiver.com SIP/2.0
Via: SIP/2.0/UDP p-cscf1.provider.com;branch=z9hG4bK667sdsgke
Via: SIP/2.0/UDP 192.168.11.32;branch=z9hG4bK667sdsgke
Max-Forwards: 69
From: sip:wendy.jones@sender.com;tag=49583
To: sip:john.smith@receiver.com
Call-ID: asd88asd66b
CSeq: 1 MESSAGE
Content-Type: text/plain
Content-Length: 173

Hello John, please meet me this afternoon at 14h00 for the weekly
sales meeting. We have re-scheduled the meeting at short notice, so
I hope you can make it. Regards, Wendy.
```

Fig. 2a

```
MESSAGE sip:john.smith@receiver.com SIP/2.0
Via: SIP/2.0/UDP p-cscf1.provider.com;branch=z9hG4bK667sdsgke
Via: SIP/2.0/UDP 192.168.11.32;branch=z9hG4bK667sdsgke
Max-Forwards: 69
From: sip:wendy.jones@sender.com;tag=49583
To: sip:john.smith@receiver.com
Call-ID: asd88asd66b
CSeq: 1 MESSAGE
Body-Token: 13579@p-cscf1.provider.com
Content-Length: 0
```

Fig. 2b

METHOD AND SYSTEM FOR TRANSFERRING A MESSAGE

TECHNICAL FIELD

The invention relates to a method of transferring a message, comprising routing information relating to the intended recipient of the message and content information, from a first node via a second node to a third node in a communications network. From the third node, the message can be transferred to a fourth node being associated with the intended recipient.

BACKGROUND

Such method may for instance be used in transmission of a Session Initiation Protocol (SIP) Message over an Internet Protocol (IP) Multimedia Subsystem (IMS) network. Such SIP Message may be transmitted from a sending SIP User Agent (UA) to a receiving SIP User Agent. In general, the SIP Message will traverse a substantial number of nodes when being transmitted over the IMS network from the sending SIP UA to the receiving SIPI UA. Hence, transmission of the SIP Message will constitute network load (IP routing) and node load (temporary data storage, data processing and data transmission).

SUMMARY

It is an object of the invention to at least partially reduce network load and/or node load during transmission of a (SIP) message. More in general, it is an object of the invention, to improve efficiency of transmission of a message over a telecommunications network.

Thereto, according to the invention is provided a method of transferring a message, comprising routing information relating to the intended recipient of the message and content information, from a first node via a second node to a third node in a communications network, wherein a repository is associated with the second node, comprising the steps of: receiving the message from the first node by the second node; storing data representative of the content information in the repository of the second node; replacing, by the second node, in the message, the content information by a token; transmitting the message, comprising the routing information and the token, from the second node to the third node; retrieving, by the third node, the content information from the second node; and replacing by the third node, in the message, the token by the content information. The message comprising the content information may be transferred to the recipient by the third node.

This provides the advantage that, instead of a message containing content information, a message containing a token may be transmitted from node to node. As in general the token can be chosen to be smaller than the content information, according to the invention the nodes transmit a smaller message, viz. the message not containing the content information but containing the token instead. Hence, both network load and node load may be reduced. It will be appreciated that the content information may comprise the information that the sending party wishes to transmit to the receiving party, such as text information, audio information and/or video information, possibly in encoded and/or encrypted form.

Preferably, the token comprises information representative of the location within the repository of the stored data representative of the content information. Hence, the content information may be easily retrieved from the repository, as its location within the repository is known from the token. Preferably, the token comprises information representative of the repository, such as a network address of the second node or a network address of an entity containing the repository, e.g. in the case the repository is external to the second node. Hence the repository can easily be accessed for retrieving the content information.

Optionally, the message is a Session Initiation Protocol (SIP) Message, and the communications network is an Internet Protocol Multimedia Subsystem (IMS) telecommunications network. It will be appreciated that the routing information of the SIP Message may be constituted by a request Universal Resource Identifier (R-URI) in the request line of the SIP Message and by one or more Route header lines of the SIP Message. It will be appreciated that the content information of the SIP Message may be constituted by the message body of the SIP Message.

Optionally, the first node is a calling party User Agent (UA) and/or the third node is a called party Proxy Call Session Control Function (P-CSCF) entity. Optionally, the second node is a, e.g. calling, Proxy Call Session Control Function (P-CSCF) entity. Optionally, the second node or the third node is an Interconnection Border Control Function (IBCF) entity.

Optionally, if the third node has retrieved the content information from the second node, the third node may indicate to the second node that the location within the repository of the stored data representative of the content information may be released. Hence, the second node may release the location within the repository of the stored data representative of the content information, after the second node has received an indication from the third node that the third node has retrieved the content information from the second node. Thus, the location within the repository may again be used to store content information relating to another message. Also, the token may be used again in another message.

Optionally, the second node may release the location within the repository where data representative of the content information is stored, upon receiving an indication that the message and/or the content information has arrived at the recipient or at an intermediate node, e.g. in the form of a 200 Ok response message, or upon receiving an indication that the message could not be delivered at the recipient or at an intermediate node, e.g. in the form of a 486 Busy Here response message.

Optionally, the second node automatically releases the location within the repository of the stored data representative of the content information after a predetermined amount of time.

According to the invention is also provided a server entity for receiving a message comprising routing information relating to the intended recipient of the message and content information in an internet based communications network from a User Agent (UA) or the communications network, and for forwarding the message to the communications network or a User Agent, the server entity comprising an input unit for receiving the message; a repository for storing data representative of the content information; a processing unit arranged for replacing in the message, the content information by a token; an output unit for forwarding the message, comprising the routing information and the token. Such server entity may act as the second node described above.

According to the invention is also provided a server entity for receiving a message comprising routing information relating to the intended recipient of the message and a token in an internet based communications network from a User Agent (UA) or the communications network, and for forwarding the message to the communications network or a User Agent, the server entity comprising an input unit for receiving the message; a retrieving unit for retrieving content information associated with the token from a network node external of the server entity; and a processing unit for replacing in the message, the token by the content information. Such server entity may act as the third node described above.

According to the invention is also provided a communications network system for receiving a message comprising routing information relating to the intended recipient of the message and content information in an internet based communications network, the network system comprising a first server entity comprising: a first input unit for receiving the message; a repository for storing data representative of the content information; a first processing unit arranged for replacing in the message, the content information by a token; a first output unit for forwarding the message, comprising the routing information and the token, and the network system further comprising a second server entity comprising: a second input unit for receiving the message comprising the routing information and the token; a retrieving unit for retrieving from the first server entity the content information associated with the token; and a second processing unit for replacing in the message, the token by the content information.

According to the invention is also provided a message, such as a Session Initiation Protocol (SIP) message, comprising routing information relating to an intended recipient of the message in an internet based communications network, such as an Internet Protocol Multimedia Subsystem (IMS) telecommunications network, the message further comprising a token comprising first information representative of an address within the network of a node having a repository associated therewith, and second information representative of a location within the repository of content information associated with the message and extracted from said message by said node.

BRIEF DESCRIPTION OF THE DRAWINGS

The invention will now be further elucidated by means of non-limiting examples referring to the drawing, in which

FIG. 2a shows an example of a SIP Message;

FIG. 2b shows an example of a SIP Message according to the invention;

DETAILED DESCRIPTION

Figure 1A:
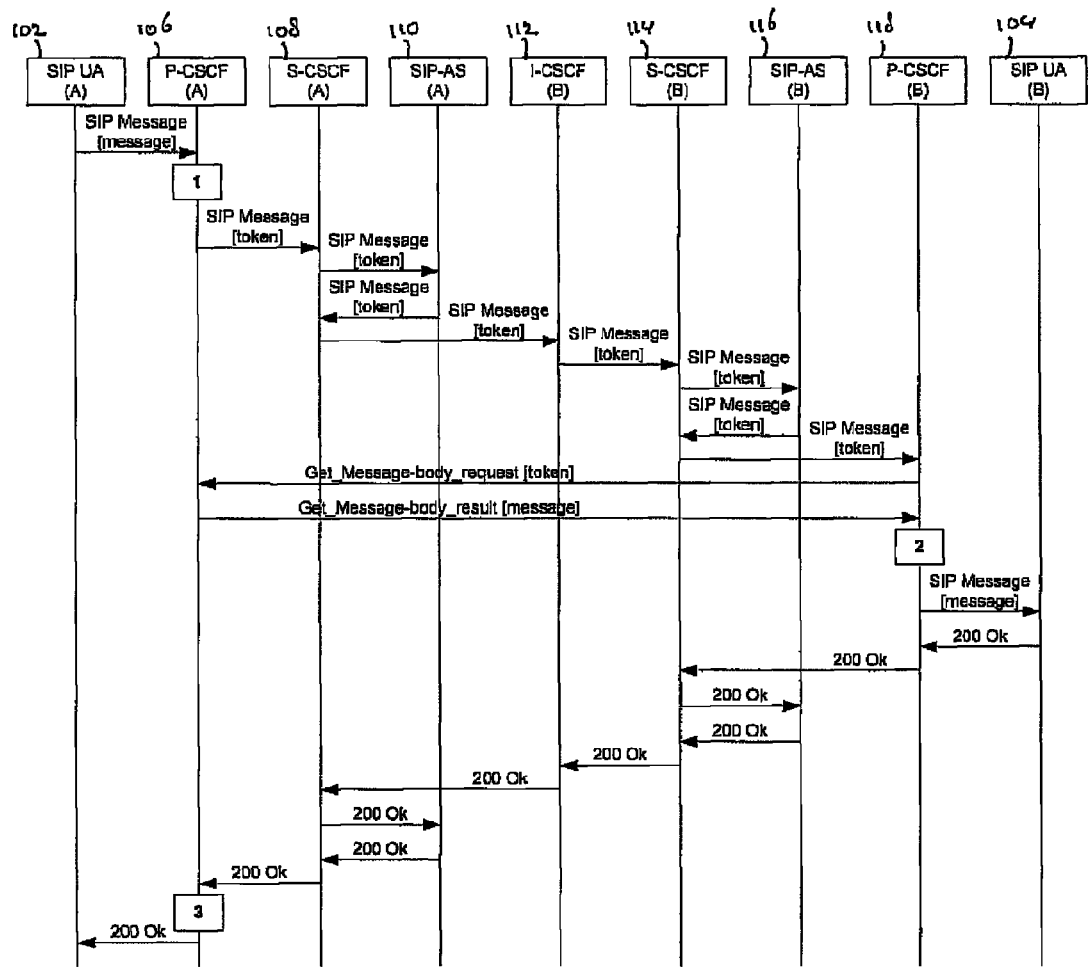
FIG. 1a shows an example of a schematic representation of message transmission according to the invention.
Figure 1B:
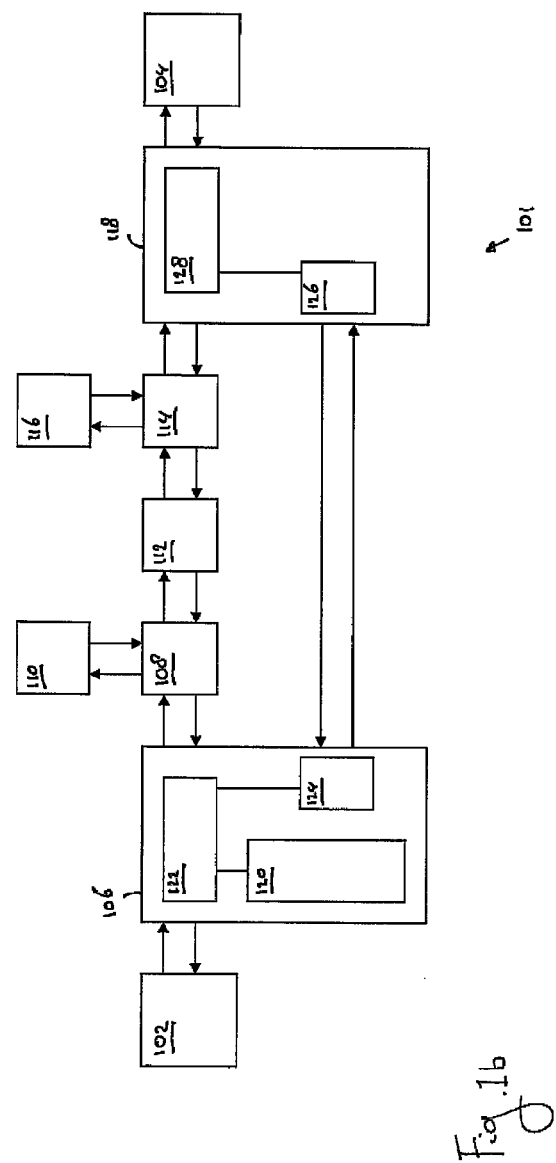
FIG. 1b shows an example of a schematic representation of a system according to the invention.

FIG. 1a shows an example of a schematic representation of a message transmission according to the invention. FIG. 1b shows a schematic representation of a system 101 according to the invention. In this example a sending Session Initiation Protocol (SIP) User Agent (UA) 102 associated with a sending party A transmits a SIP Message over an Internet Protocol Multimedia Subsystem (IMS) telecommunications network to a receiving Session Initiation Protocol (SIP) User Agent (UA) 104 associated with a receiving party B.

FIG. 2a shows an example of a SIP Message 201. The SIP Message comprises routing information. In this example, the routing information indicates the recipient of the message, in this example the SIP UA 104 associated with receiving party B (indicated by numeral 202 in FIG. 2a). In this example, the routing information also indicates the P-CSCF entity 106 associated with the sending party A (see numeral 204). Further, the message 201 comprises content information, here the message body indicated at numeral 206.

In the example of FIG. 1a and FIG. 1b the SIP Message is transmitted from the SIP UA 102 associated with sending part A to the Proxy Call Session Control Function (P-CSCF) entity 106 associated with sending party A. Next, the message is transmitted to the Serving Call Session Control Function (S-CSCF) entity 108 associated with sending party A. Next, the message is transmitted to the SIP Application Server (AS) 110 associated with sending party A. Next, the message is returned to the S-CSCF entity 108 associated with the sending party A. Next, the message is transmitted to an Interrogating Call Session Control Function (I-CSCF) entity 112 associated with the receiving party B. Next, the message is transmitted to the Serving Call Session Control Function (S-CSCF) entity 114 associated with receiving party B. Next, the message is transmitted to the SIP Application Server (AS) 116 associated with receiving party B. Next, the message is returned to the S-CSCF entity 114 associated with the receiving party B. Next, the message is sent to the Proxy Call Session Control Function (P-CSCF) entity 118 associated with receiving party B. Finally, the message is sent to the SIP UA 104 associated with the receiving party B. It will be clear that the 200 Ok message will travel in the opposite direction.

In the example of FIG. 1a, referring to task box 1, the P-CSCF 106 entity associated with sending party A upon receiving the message, stores the content information, here the message body, in a repository 120. Further, this P-CSCF entity 106 generates a token 208. In this example, the P-CSCF entity 106 replaces the content information 206 in the message by the token 208. FIG. 2b shows an example of the message of FIG. 2a wherein the content information 206 has been replaced by the token 208. In FIG. 1a the SIP Message containing the message body is indicated as "SIP Message [message]" and the SIP Message containing the token is indicated as "SIP Message [token]".

In the example of FIG. 1b the P-CSCF entity 106 comprises a processing unit 122 arranged for generating the token 208 and replacing the content information 206 in the message by the token 208. In the example of FIG. 1b the P-CSCF entity 106 also comprises an input/output unit 124 for receiving and transmitting the message.

In this example, the token 208 is representative of the location within the repository 120 of the stored content information 206. Here the token comprises an index 208a representative of the memory location of the content information associated with the token within the repository 120. In this example the token 208 is also representative of the node that stores the content information 206. Here the token comprises an indicator 208b representative of the P-CSCF entity 106 associated with the sending party A. Here the token comprises information representative of a network address of the P-CSCF entity 106. Hence, the message now comprises the token 208 comprising information representative of an address within the network of a node 106 comprising a repository 120, and information representative of a location within the repository 120 of content information 206 associated with the message and extracted from said message by said node 106. The token in this example, "13579@p-cscf1.provider.com", is structured as a Universal Resource Identifier (URI) with a user part. The token includes the address of the node where the message is stored ("p- cscf1.provider.com"). The user part, 13579, is an index to the position in the repository where the message body is stored in this P-CSCF 106.

In the example of FIG. 1a and FIG. 1b, the P-CSCF entity 118 associated with the receiving party B receives the message containing the token 208. From the token, this P-CSCF entity 118 retrieves the address of the P-CSCF entity 106 storing the content information associated with the token 208. Here, the address is "p-cscf1.provider.com". The P-CSCF entity 118 requests the P-CSCF entity 106 to transmit the content info to the P-CSCF entity 118. Thereto, the P-CSCF entity 118 in this example transmits a Get_Message-body_request to the P-CSCF entity 106. In this example, the P-CSCF 118 thereto comprises an input/output unit 126 functioning as a retrieving unit. This request contains at least the part 208a of the token representing the location within the repository 120 where the content information is stored. In response, the P-CSCF entity 106 transmits the content information directly to the P-CSCF entity 118, in this example by means of the input/output unit 124. Here, the P-CSCF entity 106 transmits the Get_Message-body_result containing the message body to the P-CSCF entity 118. It will be appreciated that the P-CSCF entity 118 may obtain the message body from the P-CSCF entity 106 over Simple Object Access Protocol (SOAP), Extensible Markup Language (XML), Hyper Text Transfer Protocol (HTTP), Lightweight Directory Access Protocol (LDAP), Diameter or other suitable Transmission Control Protocol/Internet Protocol (TCP/IP) based protocol.

In FIG. 1a, referring to task box 2, the P-CSCF entity 118 replaces the token 208 in the SIP Message by the message body 206 received from the P-CSCF entity 106. The P-CSCF entity 118 thereto comprises a processing unit 128. The SIP Message, including the content information, is now forwarded to the SIP UA 104 associated with the receiving party B. Thus, the receiving party B receives the message body transmitted by the sending party A.

In FIG. 1a, referring to task box 3, the final response, in this example 200 Ok, traverses the P-CSCF entity 106. The P-CSCF entity 106 will now release the token 208 and remove the message body 206 from the repository 120. As long as the final response for the message has not yet been transferred upstream to the P-CSCF entity 106, the message may remain in the repository 120 and can be read by any of the proxies or SIP-AS's in the signaling link, using the token 208.

In an embodiment, the P-CSCF entity 106 may apply a time-out. If the content information is not retrieved within a predetermined time interval, e.g. 30 seconds, after being stored, the content information may be discarded. The token may be kept in quarantine for a further predetermined time interval, e.g. another 30s. After that, the token may be released for re-use.

The method and system as described thus far, has the advantage that the messages as transmitted between task box 1 and task box 2, i.e. the messages containing the token, are smaller than the original message sent by the SIP UA 102, because the content information 206 is replaced by the token 208. The content information (as transported end-to-end between the SIP-UA's 102,104) is not transported in each hop (i.e. in all messages in between task box 1 and task box 2), but only once (in the Get_Message-body_result). Therefore, transmission of the message containing the token leads to less consumption of bandwidth. Further, the chance of transmission errors with sub-sequent re-transmissions (either on transport level or on application level) is also smaller. Fewer re-transmissions also contributes to less consumption of bandwidth.

It will be appreciated that the transfer of the message body from the P-CSCF entity 106 associated with the sending party A to the P-CSCF entity 118 associated with the receiving party B is preferably carried out in a reliable manner, such as using TCP/IP. The layer 5 protocol on top of TCP/IP, such as the suggested SOAP/XML, Diameter or HTTP, may include an acknowledgement from the P-CSCF entity 118 to the P-CSCF 106 entity.

In an embodiment, tokenised message transfer may be restricted to a single network. The P-CSCF entity 106 will in that case accept only message retrieval by nodes within its trust domain. It is possible that the P-CSCF entity 106 only delivers the message body associated with the token, when it has a trust relation with the requester, and when the transport of the message body is secure.

In the example of FIG. 1a and FIG. 1b, the token is generated by the P-CSCF entity 106 associated with the sending party A. It will be appreciated that it is also possible that another node stores the content information and generates a token. It is for instance possible that the S-CSCF 108 associated with the sending party A, or the SIP-AS 110 associated with the sending party A stores the content information and generates the token.

In the example of FIG. 1a and FIG. 1b the P-CSCF entity 118 associated with the receiving party B replaces the token by the content information. It will be appreciated that it is also possible that another node replaces the token by the content information in the message. It is for instance possible that the SIP-AS 110 associated with the sending party A, or the SIP-AS 116 associated with the receiving party B replaces the token by the content information.

Intermediate SIP signaling entities in between the SIP UA 102 associated with the sending party A and the SIP UA 104 associated with the receiving party B, e.g. a SIP application server 110,116, may retrieve the SIP Message body 206. The SIP-AS may take this action when it wants to inspect the contents of the message body or take some other action for which the contents of the message body is needed, such as converting the message to SMS. The SIP-AS could, for retrieving the message body from the P-CSCF entity 106 use the same method as is described above for the P-CSCF entity 118, i.e. use the token 208 including the P-CSCF entity 106 address 208b to contact the P-CSCF entity 106 and request the message body.

When the SIP-AS intends to forwards the SIP Message to a next hop, it may behave as follows. The SIP-AS may retrieve the message body, e.g. for inspection, content filtering and/or screening, and may forward the SIP Message unaltered, i.e. including the token 208 present in the received SIP Message. The SIP-AS may replace in the SIP Message the token by the actual message body; the SIP Message may then be forwarded as a normal SIP Message including the message body. Alternatively, the SIP-AS may modify the message body in the SIP Message before forwarding the SIP Message. The SIP-AS may store the message body in an internal memory, such as an internal memory of the SIP-AS or in an external memory associated with the SIP-AS, and allocate a new token (including its own address) and forward the SIP Message with this allocated new token. The SIP Message is then sent further as described earlier; subsequent SIP-AS's or proxies in the signalling path may obtain the message body from the SIP-AS as described for the present invention, namely using the new token. The SIP-AS may instruct the node from which it retrieves the message body, e.g. the P-CSCF entity, to release the token and/or location within the repository where the message body is stored; the SIP-AS now assumes responsibility for the delivery of the SIP Message including the message body at the intended recipient.

A SIP Message may be forwarded to another destination. For example, the destination subscriber may have an IMS service in SIP-AS 116 that forwards the SIP Message to another destination when a non-2xx final response is received. SIP-AS 116 may in that case forward the SIP Message while leaving the token in the message. The SIP Message will arrive at an S-CSCF entity and P-CSCF entity of a forwarded-to party (C party). The P-CSCF entity for the C-party may obtain the message body in the manner described above.

When SIP forking applies, the S-CSCF entity distributes the SIP Message over two or more terminals, i.e. sends out two or more SIP Message request messages, one to each terminal. The respective P-CSCF entities of these terminals will obtain the Message body from P-CSCF 106 and will each replace the token 208 by the message body 206.

The method of the present invention may be applied when the SIP Message traverses the IMS network boundary. Two cases are described below: Break-in and Break-out.

Figure 3:
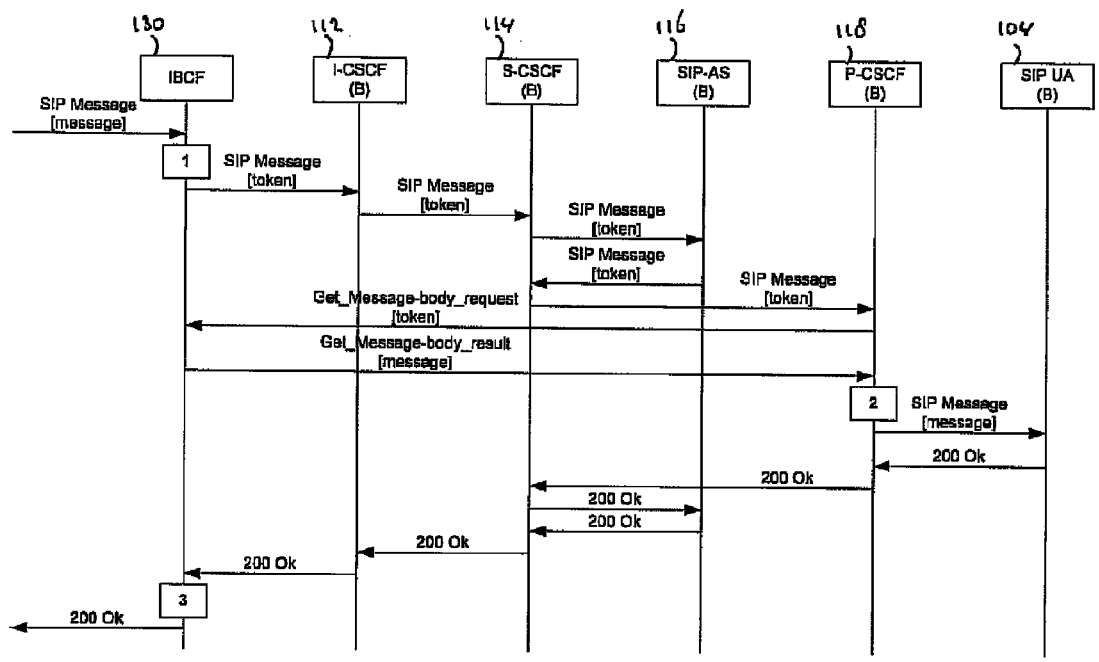
FIG. 3 shows a schematic representation of an example of message break-in according to the invention.

FIG. 3 shows a schematic representation of an example of message break-in according to the invention. In FIG. 3, an Interconnect Border Control Function (IBCF) 130 forms the break-in node at the edge of the IMS network. In this example the IBCF receives the breaking-in SIP Message.

In FIG. 3, referring to task box [1], the IBCF 130 replaces the SIP Message body 206 by a token 208 and stores the message body in a repository. In task box [2], the P-CSCF 118 retrieves the SIP Message body from the IBCF 130 and replaces, in the message, the token by this message body. In task box [3], the IBCF 130 releases the token and removes the message body from the repository.

Figure 4:
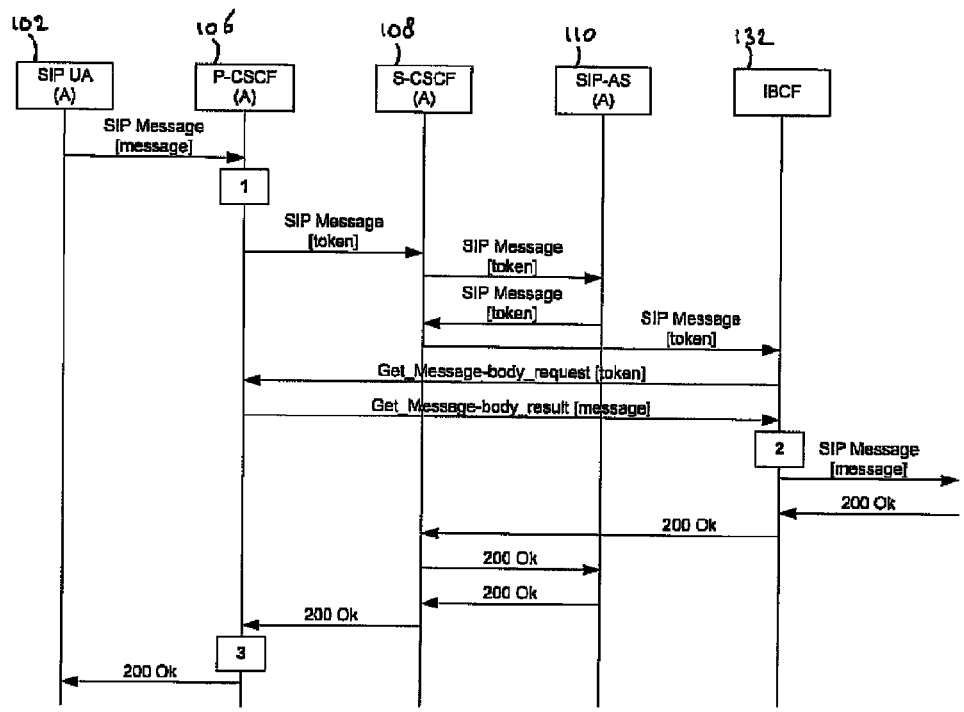
FIG. 4 shows a schematic representation of an example of message break-out according to the invention.

FIG. 4 shows a schematic representation of an example of message break-out according to the invention. In FIG. 4, an Interconnect Border Control Function (IBCF) 132 forms the break-out node at the edge of the IMS network.

In FIG. 4, referring to task box [1], the P-CSCF entity 106 replaces the SIP Message body 206 by a token 208. In task box [2], the IBCF 132 retrieves the SIP Message body from the P-CSCF entity 106 and replaces, in the message, the token by this message body. The SIP Message is now forwarded to the destination network as a regular SIP Message, including message body. In task box [3], P-CSCF 106 releases the token and removes the message body from the repository.

In the foregoing specification, the invention has been described with reference to specific examples of embodiments of the invention. It will, however, be evident that various modifications and changes may be made therein without departing from the broader spirit and scope of the invention as set forth in the appended claims.

In the examples, the token is used within one IMS network. It is not excluded, however, that the token is used across networks. When two interconnected IMS networks have appropriate agreement, the token may be passed on to the recipient network.

In the examples, the invention is described for a SIP Message. Herein a SIP Message is to be understood to comprise a SIP Message request message. The SIP Message may also comprise a SIP Message response message, including a text message in the body.

In the examples, the invention is described for a SIP Message in an IMS network. It will be appreciated that the invention may also be practiced for other messages containing routing information and content information in other communications networks.

However, other modifications, variations, and alternatives are also possible. The specifications, drawings and examples are, accordingly, to be regarded in an illustrative rather than in a restrictive sense.

In the claims, any reference signs placed between parentheses shall not be construed as limiting the claim. The word 'comprising' does not exclude the presence of other features or steps than those listed in a claim.

Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to advantage.

The invention claimed is:

1. A method of transferring a message comprising routing information relating to an intended recipient of the message and content information from a first node via a second node to a third node in an Internet Protocol Multimedia Subsystem (IMS) communications network, wherein a repository is associated with the second node, wherein the second node and the third node each are one of a Proxy Call Session Control Function (P-CSCF) node and an Interconnection Border Control Function (IBCF) node, and wherein at least one network node that is within the IMS communications network is disposed in the communications network between the second node and the third node, the method comprising:
    receiving the message from the first node by the second node;
    storing data representative of the content information in the repository associated with the second node;
    replacing, by the second node, in the message, the content information by a token;
    transmitting the message, comprising the routing information and the token, from the second node to the third node via the at least one network node disposed between the second node and the third node to save bandwidth consumption;
    responsive to receiving the message, retrieving, by the third node, the content information based on the token directly from the second node without going through the at least one network node disposed between the second node and the third node such that the content information is transported by fewer nodes in the IMS communications network than the message comprising the token; and
    replacing by the third node, in the message, the token by the content information and transferring the message comprising the content information to a recipient over the communications network.

2. The method according to claim 1, wherein the token comprises information representative of a location within the repository of the stored data representative of the content information.

3. The method according to claim 1, wherein the token comprises information representative of the repository, including at least one of a network address of the second node and a network address of a device containing the repository when the repository is external to the second node.

4. The method according to claim 1, wherein the message is a Session Initiation Protocol (SIP) Message, and the communications network is an Internet Protocol Multimedia Subsystem (IMS) telecommunications network.

5. The method according to claim 4, wherein at least one of the first node is a calling party User Agent (UA) and the third node is a called party Proxy Call Session Control Function (P-CSCF) entity.

6. The method according to claim 4, wherein the second node is a Proxy Call Session Control Function (P-CSCF) entity.

7. The method according to claim 4, wherein one of the second node and the third node is an Interconnection Border Control Function (IBCF) entity.

8. The method according to claim 1, further comprising the second node releasing the location within the repository of the stored data representative of the content information after the second node has received an indication from the third node that the third node has retrieved the content information from the second node.

9. The method according to claim 1, further comprising the second node releasing the location within the repository of the stored data representative of the content information upon receiving a message.

10. The method according to claim 1, further comprising the second node releasing the location within the repository of the stored data representative of the content information after a predetermined amount of time.

11. A server entity for receiving a message comprising routing information relating to the intended recipient of the message and content information in an Internet Protocol Multimedia Subsystem (IMS) communications network from one of a User Agent (UA) and the communications network, and for forwarding the message to one of the communications network and a second User Agent, wherein the server entity is one of a Proxy Call Session Control Function(P-CSCF) node and an Interconnection Border Control Function (IBCF) node, the server entity comprising:
   an input unit for receiving the message;
   a repository for storing data representative of the content information;
   a hardware processing unit arranged for replacing in the message, the content information by a token; and
   an output unit for forwarding the message, comprising the routing information and the token, via at least one network node that is within the IMS communications network, to a second network node in the communications network to save bandwidth consumption, and for forwarding the content information associated with the token directly to the second network node responsive to receiving a request comprising the token from the second network node without going through the at least one network node disposed between the second node and the server entity, wherein the second network node is one of a Proxy Call Session Control Function (P-CSCF) node and an Interconnection Border Control Function (IBCF) node, and wherein the content information is transported by fewer nodes in the IMS communications network than the message comprising the token.

12. A server entity for receiving a message comprising routing information relating to an intended recipient of the message and a token in an Internet Protocol Multimedia Subsystem (IMS) communications network from one of a first User Agent (UA) and the communications network, and for forwarding the message to one of the communications network and a second User Agent, wherein the server entity is one of a Proxy Call Session Control Function (P-CSCF) node and an Interconnection Border Control Function (IBCF) node, the server entity comprising:
   an input unit for receiving the message from a first network node in the communications network via an intermediate network node in the communications network, wherein both the first network node and the intermediate network node are disposed in the communications network external to the server entity, wherein the first network node is one of a Proxy Call Session Control Function (P-CSCF) node and an Interconnection Border Control Function (IBCF) node;
   a retrieving unit for retrieving, based on the token, content information associated with the token directly from the first network node external of the server entity without going through the intermediate network node disposed between the first network node and the server entity such that the content information is transported by fewer nodes in the IMS communications network than the message comprising the token in order to reduce network load; and
   a hardware processing unit for replacing in the message, the token by the content information;
   wherein the server entity is further arranged for transferring the message comprising the content information to the recipient over the communications network.

13. A communications network system for receiving a message comprising routing information relating to the intended recipient of the message and content information in an Internet Protocol Multimedia Subsystem communications network, the network system comprising:
   a first server entity, said first server entity being one of a Proxy Call Session Control Function (P-CSCF) node and an Interconnection Border Control Function (IBCF) node, comprising:
      a first input unit for receiving the message;
      a repository for storing data representative of the content information;
      a first hardware processing unit arranged for replacing the content information in the message with a token;
      a first output unit for forwarding the message, comprising the routing information and the token, to a first network node in the communications network to save bandwidth consumption, said first server entity external of the first network node; and
   a second server entity external of the first network node, said second server entity being one of a Proxy Call Session Control Function (P-CSCF) node and an Interconnection Border Control Function (IBCF) node, comprising:
      a second input unit for receiving the message comprising the routing information and the token from the first network node;
      a retrieving unit for retrieving, based on the token, the content information associated with the token directly from the first server entity without going through at least one network node that is within the IMS communications network disposed between the second node and the third node such that the content information is transported through fewer network nodes in the IMS communications network than the message comprising the token; and
      a second hardware processing unit for replacing the token in the message with the content information;
      the second server entity being further arranged for transferring the message comprising the content information to the recipient over the communications network.

14. The communications network system according to claim 13, wherein the message is a Session Initiation Protocol (SIP) message.

* * * * *

UNITED STATES PATENT AND TRADEMARK OFFICE
CERTIFICATE OF CORRECTION

Page 1 of 1

PATENT NO.       : 9,026,599 B2
APPLICATION NO.  : 13/500290
DATED            : May 5, 2015
INVENTOR(S)      : Noldus et al.

It is certified that error appears in the above-identified patent and that said Letters Patent is hereby corrected as shown below:

Claims

In Column 9, Line 28, in Claim 11, delete "Function(P-CSCF)" and insert -- Function (P-CSCF) --, therefor.

Signed and Sealed this
Thirteenth Day of October, 2015

Michelle K. Lee
*Director of the United States Patent and Trademark Office*